Patented Aug. 28, 1923.

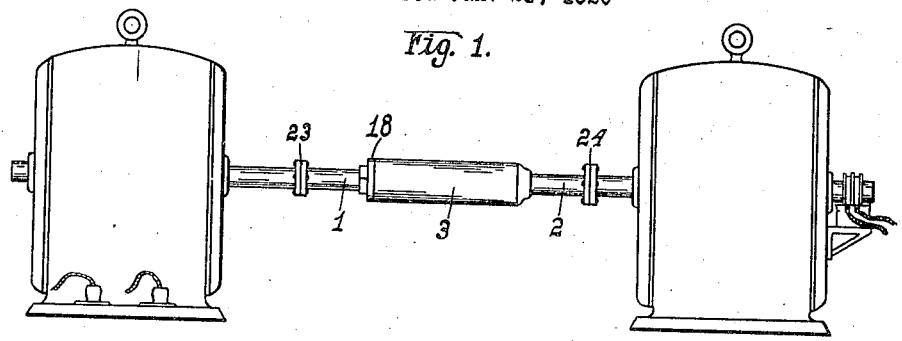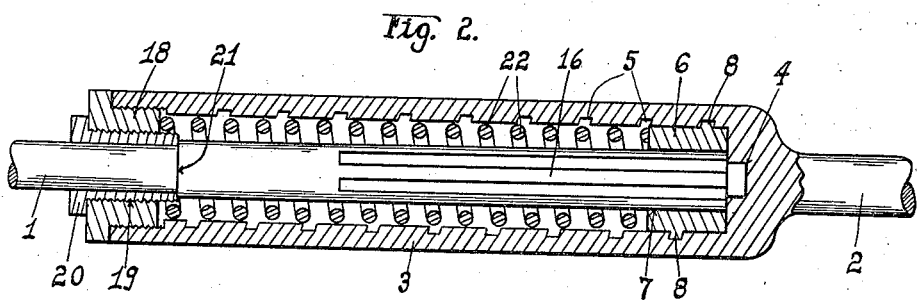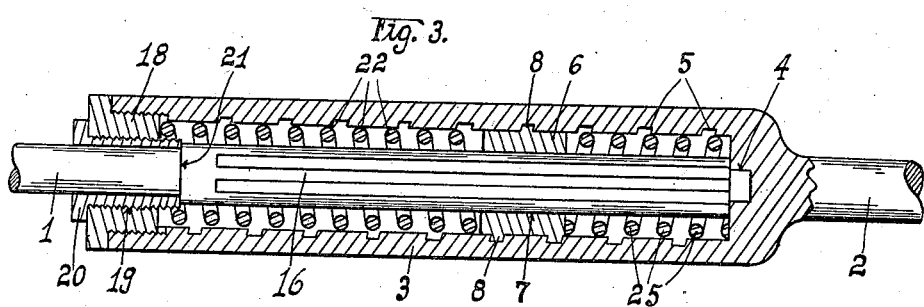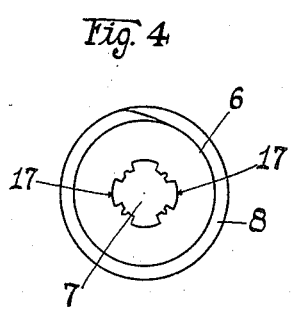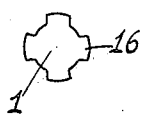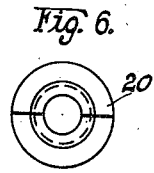
Charles A. Taber.

1,466,414

UNITED STATES PATENT OFFICE.

CHARLES A. TABER, OF OAKLAND, CALIFORNIA.

TORQUE SHOCK ABSORBER.

Application filed January 21, 1920. Serial No. 353,007.

*To all whom it may concern:*

Be it known that I, CHARLES A. TABER, a citizen of the United States, residing at Oakland, in the county of Alameda and State of California, have invented certain new and useful Improvements in Torque Shock Absorbers, of which the following is a specification.

My invention is a torque shock absorber.

Referring to the annexed drawing which forms a part of this specification:

Figure 1 is a side elevation of my invention shown connecting the shaft of a motor and the shaft of a generator.

Figure 2 is a longitudinal section of one form of my invention.

Figure 3 is a longitudinal section of another form of my invention.

Figure 4 is an end view of the slidable head.

Figure 5 is an end view of the driven shaft.

Figure 6 is an end view of one of the driven shaft bearings.

My torque shock absorber includes two members, a drive shaft 1 and a driven shaft 2. The driven shaft 2 has an enlarged hollow section 3 into which the shaft 1 extends and which is formed with a bearing 4 in which the inner end of the said shaft is journaled. The section 3 is provided with an internal thread 5. A slidable head 6 is formed with an opening 7 through which the shaft 1 extends, and has external thread 8 which engages thread 5. The head 6 is splined on the shaft 1 by means of tongues 16 on the shaft and grooves 17 in the head through which grooves said tongues extend. A head 18 screws into the outer end of the shaft section 3. Said head has an internally threaded opening 19 into which screws an externally threaded bearing 20 in which is journaled the shaft 1, the shaft journal and bearing being of less diameter than the inner portion of the shaft forming a shoulder 21 which engages the inner end of the bearing and prevents drawing apart of members 1 and 2. A spring 22 is coiled around shaft 1 within shaft section 3 between heads 6 and 18. The shaft 1 may be coupled by coupling 23 to the shaft of an electric motor, gas engine or other source of power. The shaft 2 may be coupled by coupling 24 to the shaft of a generator or to any other transmission element.

In the form of my invention shown in Figure 3 a spring 25 is coiled within shaft section 3 around shaft 1 between head 6 and the inner end of the section.

In case of sudden torque shock the head 6, by its engagement with thread 5, is caused to travel toward head 18 and compress the spring 22, whereby said torque shock is absorbed. The spring returns the head 6 and the shaft 1 and 2 to their normal position.

The form of my invention shown in Figure 3 is used where it is desired to absorb backward as well as forward torque. The spring 25 absorbs the backward torque.

The bearing 20 may be screwed into position or unscrewed to introduce the shaft 1 into the hollow section 3 or to remove the shaft from said section without removing the spring 22. The spring may be removed or introduced into said section upon unscrewing or screwing the head 18 into the section 3.

Having described my invention I claim:

A torque shock absorber between a drive shaft and a driven shaft, a tubular hollow section integral with one shaft, the other shaft extending into said hollow section and a journal therefor in the inner end of the hollow section, a slidable head splined on said other shaft and in threaded engagement with said hollow section, a head screwed into the outer end of said hollow section, a tubular bearing screwed into and extending beyond and through said head, said other shaft being journaled in said bearing, the bearing and the journal serving to retain the two shafts in alignment and to relieve lateral pressure on the slidable head, a shoulder formed on said other shaft engaging the inner end of said bearing, so that relative longitudinal movement will be prevented and a spring interposed in said hollow section, one end of the spring pressing against the slidable head, the other end of the spring pressing against the head and lying between the bearing and the inner surface of the hollow section, the outer surface of the spring contacting with the inner surface of the tubular section as and for the purpose described.

In testimony whereof I affix my signature.

CHARLES A. TABER.